UNITED STATES PATENT OFFICE 2,642,419

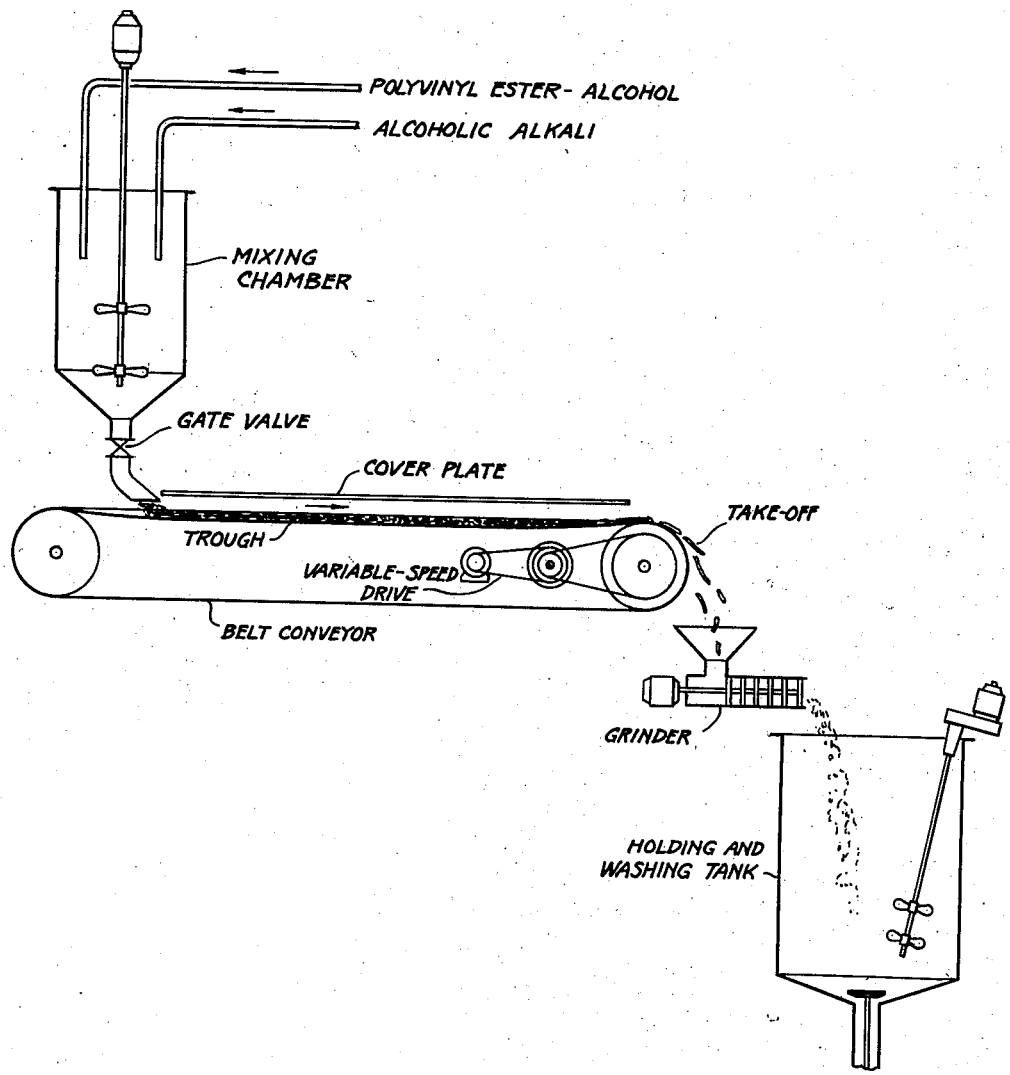

PREPARATION OF POLYVINYL ALCOHOL

George P. Waugh and William O. Kenyon, Rochester, N. Y., assignors to Eastman Kodak Company, Rochester, N. Y., a corporation of New Jersey Application January 31, 1950, Serial No. 141,450

4 Claims. (Cl. 260—91.3)

This invention relates to polyvinyl alcohol, and more particularly to improvements in production and purification of polyvinyl alcohol. More specifically, the invention relates to an improved method of preparing highly purified and substantially fully hydrolyzed polyvinyl alcohol which is suitable for use in the production of photographic emulsions or for use in other instances which require such refined polyvinyl alcohols.

In the Kenyon et al. U. S. patent application Serial No. 36,816 filed July 2, 1948, are disclosed and claimed basic procedures for the deacetylation of polyvinyl esters and for removing impurities from the product to insure a polyvinyl alcohol of highest purity. The present application is distinguished in that it utilizes some of the processes of the co-pending invention together with newly discovered processes for preparing a uniform quality of polyvinyl alcohol on a large manufacturing scale.

In the art of photography, it has been found that the quality of the silver halide emulsion vehicle, usually gelatin, has a pronounced effect upon the sensitivity and keeping properties of the finished product. When polyvinyl alcohol is used as the emulsion vehicle, similar effects are observed and it is therefore most essential that a uniform grade of polyvinyl alcohol be available. Therefore, one object of our invention is to provide a method for preparing a high grade of polyvinyl alcohol of uniform quality. Another object is to provide a polyvinyl alcohol having low residual acetyl content. A further object is to provide a polyvinyl alcohol gel having minimum solubility in cold water. Another object is to provide polyvinyl alcohols uniformly soluble at moderate and elevated temperatures. Other objects are set forth in the co-pending application and further objects will become apparent from the following description of our invention. These objects are in general accomplished by the deacylation of polyvinyl esters by means of alkaline alcoholysis as opposed to acid alcoholysis, and in this process, while the alcoholysis is in progress and the reaction mixture is in the fluid state, the reaction mixture is deposited on a surface, preferably on the surface of a moving carrier, then allowing the mixture to set to a gel and before substantial syneresis has taken place, subdividing the gel, then allowing the gel in the subdivided state to synerese followed by washing with water at a temperature below which the gel is soluble.

In the accompanying drawings is shown a diagrammatic view of the methods and apparatus used in our invention.

According to the broadest concept of our invention we initiate the deacylation of a synthetic resin having acyl groups in a solvent for the resin which is not a solvent for the deacylated resin, by introducing a deacylation catalyst, preferably alkali metal hydroxide, into the solvent solution of the resin, then while the solution is in the fluid state depositing it in or upon the surface of a carrier where it is allowed to gel, and then removing the gel from the carrier and comminuting it and further purifying it. To our knowledge, it has not previously been described to initiate such a reaction and then to utilize the resultant purely chemical change in a reactant thereof to produce a particular change in physical form.

In accordance with a more specific concept of the invention, a polyvinyl alcohol in gel form which is resistant to dissolving or sliming in water can be prepared by vigorously mixing alcoholic solutions of polyvinyl ester and alkali in a mixing chamber of the design similar to that shown in the drawings. Thorough mixing is an essential feature of our process; otherwise deacetylation will not proceed uniformly and a product of variable quality will result. That is, if the gel is composed of polyvinyl alcohols having solubilities in water at different temperatures, the temperature required to dissolve the gel as a whole may be unduly high in order to dissolve the least readily soluble portions and conversely those portions less completely deacetylated may be soluble in water and lost during washing. The alcohol used is preferably methyl alcohol although other alcohols such as ethyl alcohol can be used and the alkali is preferably sodium hydroxide although other alkali metal hydroxides as well as alkali metal alcoholates are useful, as disclosed in the parent application. Similarly, the water content of the alcohol should not be more than about 10 to 12% and preferably not over 5%.

The mixing procedure is also critical in the respect that the mixing time should be so correlated with the balance of the process that sufficient time will remain before the composition sets to a gel that the composition may be deposited in the fluid state on to the carrier surface. Generally, the mixing operation can be carried out for from about .01 to 0.1 of the total time required for the composition to set to a gel for a mixer of the type shown in the drawings. Other types of mixers with less holdup would require correspondingly less mixing time. Mixing appreciably longer may result in undue plugging of the mixer and feed line from the mixing chamber. The quality of the product may be adversely affected if the gel remains on the carrier overlong and becomes too firm, an undesirable decrease in solubility in water taking place in the subsequent grinding step due to milling action. Similarly, the concentration of alkaline catalysts and the temperature of the mixture on the carrier surface should be carefully regulated to obtain the optimum structure of gel for grinding. We prefer to use a temperature and catalyst concentration such that the gelling time is approximately 3 to 6 minutes. A gelling time substantially less than 3 minutes, e. g., 2 minutes, can be used. However, a gel is obtained which is not as strong or as water-resistant, presumably because the molecules are not properly oriented within the gel structure. Consequently appreciable amounts of gel may be lost in the washing step. Longer gelling times can be used within the limitations of the equipment such as the speed and length of the conveyor.

After completion of the mixing operation, the reaction mixture is deposited on a surface, preferably the surface of a moving carrier, in a suitable manner, for example, by pumping from the mixing chamber and coating on the carrier or as shown in the drawings by gravity flow from the mixing chamber to the carrier. As shown in the drawings, the preferred carrier is a continuous recessed moving belt; that is, the belt is supported by a trough flared at both ends and the belt conforms to the contour of the trough. The result is that the mixture deposits in substantial thickness on the belt and as it is carried away from the outlet of the mixing chamber, it gels in the shape of the trough. Alternately, the belt can be provided with a series of recesses and provision can be made for ejection of the gel after gelation. A suitable belt is canvas coated with polyvinyl alcohol followed by a layer of alcohol-resistant material such as cellulose ester or a resin, especially a vinyl chloride-vinyl acetate copolymer.

The reaction mixture is carried by the belt at a suitable speed depending upon the length of the carrier and the gelation time remaining after mixing. A representative speed is 22 inches per minute under the conditions of Example 1 following. The mixture may be expected to commence to show signs of gelation one-half to two-thirds of the way to the take-off point of the carrier and at the take-off point the composition has solidified to a gel and may be starting to show signs of syneresis. At this point before substantially any syneresis has taken place, we remove the gel from the belt and at once pass it into the grinder, cubing machine or other apparatus for subdividing the gel in the required manner.

The point at which the gel is comminuted is an important feature of our invention. We have found that if syneresis is allowed to proceed for any appreciable time before grinding and the gel becomes appreciably harder thereby, the subsequent comminuting operation may have a mechanical working effect the result of which is to raise the minimum solution temperature of the gel in water. Consequently, for maximum quality we prefer to remove the gel from the carrier before substantial syneresis has occurred which is after a period of time has elapsed of about two times the gelling time of the catalyst-dope mixture. On the other hand, if the gel is ground too soon, when it is sticky, the particles will cohere in the grinder.

Following comminution we can allow the subdivided gel to synerese; the supernatant liquid, including alcohol and methyl acetate, being withdrawn and the particles of gel are washed until free of salt. If desired, for the purpose of further deacetylation as disclosed in the parent application, Example 21 thereof, before washing but after syneresis for at least one hour, with or without withdrawal of the liquid of syneresis, an additional quantity of alcoholic alkali may be added to the comminuted gel.

At this point, a syneresis period of one hour or more is important since this increases the strength of the gel and its resistance to water. A fresh gel which has not undergone syneresis will be soluble in water at practically any temperature. During the syneresis period the particles of gel are allowed to stand if desired with gentle stirring, for about 1 to 2 days to complete the deacetylation, then the liquid of syneresis is drained off and the gel washed with water. If desired, the addition of fresh catalyst may be in the form of an aqueous alkaline solution as disclosed in the parent application. Most of the methyl acetate should be washed out before such treatment. The result of this procedure is to obtain a gel having lower residual acetyl content than obtained when adding the catalyst in alcoholic solution. The "minimum solution temperature" is defined as the temperature at which a sample of gel when stirred vigorously in water becomes a smooth solution.

Our invention will now be described by means of the following examples which, together with the examples of our parent application and the drawings, will serve to illustrate our invention:

*Example 1*

In this procedure a 30 per cent dope of polyvinyl acetate in methanol, viscosity 1500 centipoises, is pumped and continuously mixed with a 10 per cent solution of sodium hydroxide in methanol. Rigid control of temperature at this point and later on in the process is important since small changes in temperature have an appreciable effect upon the rate of alcoholysis. The solutions are essentially anhydrous although they can contain the indicated amount of water. The resin dope and the alkaline catalyst solution are metered into the mixing chamber by means of gear pumps in the proportion of one volume of catalyst solution to ten of dope. A suitable pumping speed is 640 cc. of dope per minute. The mixing chamber is provided with an efficient propeller for mixing the ingredients and an outlet valve as indicated in the drawings to control the flow of the mixture to the conveyor. As shown in the drawings, the mixer is located at one end of a trough in which the belt runs. The trough is 9.5 feet long and is made of light gauge stainless steel and is approximately 2.75 inches wide and 1.5 inches deep. At the mixer end the trough is gradually tapered from a semi-circular shape to flat to receive the belt as it comes from the pulley, the flat part being kept at the level of the sides of the trough to prevent the dope-catalyst mixture from running out of the trough. At the other end of the machine the trough is also spread somewhat to facilitate flattening of the belt as it passes over the pulley. The trough is supported by flanges and is covered with a glass or metal plate to minimize evaporation for the reasons set forth hereinafter. The belt is made of canvas, preferably coated with polyvinyl alcohol and then a layer of vinyl chloride-vinyl acetate copolymer although other surfaces can be used as well as other belts such as stainless steel. The belt runs over the pulleys as indicated and can be driven at various speeds. The mixture of resin and catalyst sets to a gel about half-way down the trough and if necessary, this can be hastened by using a larger proportion of alkali or by operating at a slightly higher temperature, preferably below the boiling point of the mixture. During the latter half of the trough the gel becomes reasonably firm and has hardened to the extent that it is no longer sticky. This is particularly true if the mixture is allowed to gel in a closed atmosphere designed to retard evaporation of solvent from the surface. That is, we have found that if the dope-catalyst mixture is allowed to gel on the conveyor with the exposed surface free to the air, the mixture sets to a gel which is progressively softer from the conveyor surface outward and the latter surface may be slightly sticky at the take-off point. This effect is presumably due to the cooling effect of evaporation of solvent from the surface of the composition. To compensate for this effect, we prefer to allow the mixture to set to a gel in a closed atmosphere retarding surface evaporation and in the present example this may be accomplished by covering the trough with a metal, glass or other suitable plate as shown in the drawings.

At the take-off point of the conveyor, as syneresis is starting, the gel is removed from the belt and ground up, the comminuted gel passing from the grinder to a holding tank where it is allowed to synerese for one hour or more following which an additional quantity of alkali in methanol solution (e. g., approximtely 6–16 lbs. sodium hydroxide per 100 lbs. of polyvinyl alcohol) is added. After one to two days' standing at room temperature with occasional stirring of the particles of gel, the liquor is drained off through the bottom of the holding tank or in any other suitable manner and the gel is washed with cold water for two days or more. The result is to obtain a polyvinyl alcohol gel substantially free from acetyl and salts and having a minimum solution temperature of approximately 75° C.

*Example 2*

In a manner similar to that of the above example, a 24 per cent solution of polyvinyl acetate in methanol was run into the mixing chamber at a rate of 52 cc. per minute, at the same time introducing a 10 per cent solution of sodium hydroxide in methanol into the mixing chamber at approximately 6.1 cc. per minute. The mixture was then pumped continuously by means of a gear pump from the mixing chamber through an extrusion apparatus from which it emerged as a gel which was comminuted and treated further as described in the above example.

While the belt conveyor method comprises a preferred embodiment of our invention, we are not limited thereto as a means for receiving and conveying the dope-catalyst mixture during the gelling period, since we can instead use, for example, a circular moving trough provided with a scoop continuously removing the gel as the trough revolves, the fresh dope-catalyst mixture being continuously deposited in the trough back of the scoop. Similarly, we can use a screw or similar conveyor, the gel emerging at the required rate from the outlet of the conveyor. Similarly, a stationary surface or a series of stationary receptacles can be used for receiving the reaction mixture from a moving hopper or similar equipment. Conventional wheel coating methods may also be utilized. Other conveyor means will occur to those skilled in the art.

In view of the fact that the acid catalyzed alcoholysis of polyvinyl esters is relatively slow compared to the alkaline catalyst alcoholysis, it will be apparent why our preferred process is the alkaline catalyzed method. However, we may use acid in the purification steps subsequent to the grinding operation; for example, to increase the viscosity of the polyvinyl alcohol or for other reasons indicated in our parent application.

The advantages of our novel process are now apparent. Since we initiate the alcoholysis of polyvinyl acetate and conduct the gelation and comminuting steps in a continuous manner, we are not subject to the difficulties of maintaining uniform quality of product which is typical of batchwise operation and uniformity of product is thereby assured. Our process is not simply the conversion of an old batch process to a continuous process, especially since our process produces novel polyvinyl alcohols; that is, of the type washable in water. Moreover, our process of laying out the reaction mixture on a conveyor where it assumes substantial thickness, entails a mechanical fabrication of a reaction mixture which is a novel step.

Procedures other than those specifically set forth in the instant invention and disclosed in the mentioned co-pending application may be introduced into our process for modifying the character of the final polyvinyl alcohol; for example, the acetal content and color of the polyvinyl alcohol may be reduced. The alkaline catalyst, the alcohols, and polyvinyl esters useful in our process are those disclosed in the parent application.

Our invention having been described, we would have it understood that the disclosure herein is by way of example and that we consider as included in our invention all modifications and equivalents falling within the scope of the appended claims.

We claim:

1. A method for the continuous manufacture of polyvinyl alcohol which comprises preparing an essentially anhydrous alcoholic solution of an alkali metal hydroxide of the group consisting of lithium, sodium and potassium hydroxides, and an essentially anhydrous alcoholic solution of polyvinyl acetate, simultaneously introducing said solutions into a mixing chamber and thoroughly mixing said solutions, while the resultant mixture is in a fluid state continuously flowing it out onto an inert surface continuously moving away from the source of mixing, allowing the mixture to form a gel on said surface and after approximately twice the gelling time of said mixture and before substantial syneresis has taken place continuously removing the gel from the surface and immediately thereafter comminuting the gel, allowing the comminuted gel to synerese for at least one hour and washing it with water at a temperature below the minimum solution temperature of the gel.

2. A method for the continuous manufacture of polyvinyl alcohol which comprises preparing an essentially anhydrous alcoholic solution of an alkali metal hydroxide of the group consisting of lithium, sodium and potassium hydroxides, and an essentially anhydrous alcoholic solution of polyvinyl acetate, simultaneously introducing said solutions into a mixing chamber and thoroughly mixing said solutions, while the resultant mixture is in a fluid state continuously flowing it out into an inert surface continuously moving away from the source of mixing in an atmosphere retarding solvent evaporation, allowing the mixture to form a gel on said surface and after approximately twice the gelling time of said mixture and before substantial syneresis has taken place continuously removing the gel from the surface and immediately thereafter comminuting the gel, allowing the comminuted gel to synerese for at least one hour and washing it with water at a temperature below the minimum solution temperature of the gel.

3. A method for the manufacture of polyvinyl alcohol which comprises preparing an essentially anhydrous methanol solution of sodium hydroxide, and an essentially anhydrous methanol solution of polyvinyl acetate, simultaneously introducing said solutions into a mixing chamber and thoroughly mixing said solutions, while the resultant mixture is in a fluid state continuously flowing it out onto an inert surface continuously moving away from the source of mixing in an atmosphere retarding solvent separation, allowing the mixture to form a gel on said surface and after approximately twice the gelling time of said mixture and before substantial syneresis has taken place continuously removing the gel from the surface and immediately thereafter comminuting the gel, allowing the comminuted gel to synerese for at least one hour and washing it with water at a temperature below the minimum solution temperature of the gel.

4. A method for the continuous preparation of polyvinyl alcohol which comprises preparing an essentially anhydrous methanol solution of approximately 10% sodium hydroxide and an essentially anhydrous methanol solution of approximately 24 to 30% polyvinyl acetate, simultaneously introducing said solutions into a mixing chamber in the proportion of approximately one volume of sodium hydroxide solution to approximately 10 volumes of polyvinyl acetate solution and thoroughly mixing the solutions, while the resultant mixture is in a fluid state continuously flowing it out onto an inert surface continuously moving away from the source of mixing in an atmosphere retarding solvent evaporation, allowing the mixture to form a gel on said surface and after approximately twice the gelling time of said mixture and before substantial syneresis has taken place continuously removing the gel from the surface and immediately thereafter comminuting the gel, allowing the comminuted gel to synerese for at least one hour and washing it with water at a temperature below the minimum solution temperature of the gel.

GEORGE P. WAUGH.
WILLIAM O. KENYON.

References Cited in the file of this patent

UNITED STATES PATENTS

| Number | Name | Date |
|---|---|---|
| 2,356,896 | Smith | Aug. 29, 1944 |
| 2,399,653 | Roland | May 7, 1946 |
| 2,467,774 | Plambeck | Apr. 14, 1949 |
| 2,499,097 | Howk et al. | Feb. 28, 1950 |

OTHER REFERENCES

Blout et al., Journ. Amer. Chem. Soc., vol. 70, Feb. 1948, pp. 862 to 865.

Karrer, Organic Chemistry, 2nd English Edition, Elsevier, 1946, page 106.